United States Patent [19]
Nakazawa et al.

[11] Patent Number: 5,231,596
[45] Date of Patent: Jul. 27, 1993

[54] POSITION DETECTOR HAVING A SINGLE SET DETECTOR FOR ABSOLUTE CODES

[75] Inventors: Koichi Nakazawa, Amagasaki; Norio Okutani, Neyagawa, both of Japan

[73] Assignee: Matsushita Electric Industrial Co., Ltd., Osaka, Japan

[21] Appl. No.: 691,332

[22] Filed: Apr. 25, 1991

[30] Foreign Application Priority Data

Apr. 28, 1990 [JP] Japan ................. 2-114383
Oct. 5, 1990 [JP] Japan ................. 2-268661

[51] Int. Cl.⁵ ................................. G01B 7/02
[52] U.S. Cl. ........................ 364/560; 364/182; 364/167.01; 250/237 G; 341/13
[58] Field of Search ........... 364/559, 560, 561, 474.14, 364/474.28, 474.31, 571.01, 167.01, 182; 250/231, 237 G; 341/13; 33/1 N, 1 P, 1 T, 706, 707, 708; 340/870.28, 870.29, 870.37; 356/374; 318/602, 652, 254

[56] References Cited

U.S. PATENT DOCUMENTS 4,633,224 12/1986 Gipp et al. ............... 250/231.18
5,129,725 7/1992 Ishizuka et al. .............. 33/707

FOREIGN PATENT DOCUMENTS 0192822 11/1982 Japan ........................ 33/707
0022511 1/1990 Japan ....................... 364/559

OTHER PUBLICATIONS

Waldo H. Kliever, Measure Position Digitally, Nov. 1956 pp. 108-113.

Primary Examiner—Jack B. Harvey
Assistant Examiner—Hal D. Wachsman
Attorney, Agent, or Firm—Wenderoth, Lind & Ponack

[57] ABSTRACT

A position detector for use in, for example, a robot hand can detect any of a plurality of positions on a movable element. The position detector includes a coding member having a first row of absolute codes and a second row of incremental codes both formed therein in a direction of movement thereof. Positional data in binary codes are serially recorded in the first row whereas regularly formed incremental codes corresponding to respective binary codes are recorded in the second row. The position detector further includes a plurality of light emitting and receiving elements for detecting the codes of the first and second rows and a serial-parallel converter for converting serially detected binary codes of the first row to parallel rows of binary codes based upon detection signals of the second row. The binary codes in each parallel row are equal in number to recording bits of the positional data.

4 Claims, 7 Drawing Sheets

POSITION DETECTOR HAVING A SINGLE SET DETECTOR FOR ABSOLUTE CODES

BACKGROUND OF THE INVENTION

1. Field of the Invention

The present invention relates to a position detector capable of absolutely detecting any of a large number of positions spaced, for example, circumferentially of a rotary element, without returning to an origin or a starting point.

2. Description of the Prior Art

Conventionally, magnetic encoders or optical encoders are in wide practical use as encoders for detecting an absolute position on a rotary element such as, for example, a robot hand. In particular, optical encoders employing binary codes can detect the absolute position with superior responsibility and reliability.

In the binary codes, however, since a row of codes merely provide position data of one bit, an encoder having a high resolution needs plural rows of codes corresponding to the number of bits required, light emitting and light receiving elements corresponding thereto, and an amplifier unit or units. As a result, there arises a problem in that the encoder becomes expensive because the number of parts increases and adjustments thereof are troublesome and time-consuming.

SUMMARY OF THE INVENTION

The present invention has been developed to overcome the above-described disadvantage.

It is accordingly an object of the present invention to provide a position detector which can detect an absolute position with a high reliability and in which the number of parts required is reduced for cost reduction.

In accomplishing this and other objects, a position detector according to the present invention comprises a coding member having a first row of absolute codes and a second row of incremental codes both formed therein in a direction of movement thereof. Positional data in binary codes are serially recorded in the first row whereas regularly formed codes corresponding to respective binary codes are serially recorded in the second row. The position detector further comprises means for detecting codes of the first and second rows and means for converting serially detected the binary codes of the first row to parallel rows of binary codes based upon detection signals of the second row. The binary codes in each parallel row are equal in number to recording bits of the positional data.

Preferably, the first row consists of M-series codes and the position detector further comprises a means for converting the parallel rows of binary codes to positional data.

A third row of absolute codes consisting of reversed codes of the first row may be formed in the coding member to thereby strengthen signals against noise.

The positional data may be recorded together with separation signals in the first row.

In this case, the position detector conveniently further comprises a means for interpolating between adjoining positions to be detected by the first row based upon detection signals of the second row.

In the above-described construction according to the present invention, the absolute position circumferentially of a rotary disc or plate can be detected by serially reading the positional data of the first row of absolute codes on the basis of detection signals of the second row of incremental codes and by converting the serial positional data to parallel positional data. The position detector according to the present invention is, therefore, advantageous in that the absolute position can be detected on the basis of the positional data of plural bits merely by the provision of at least two rows of absolute codes and incremental codes in the coding member.

Furthermore, a row of absolute codes employing M-series codes can detect the absolute position whenever each one bit of absolute codes is newly read. As a result, the detection of the absolute position of any of extremely closely spaced locations on the coding member can be achieved with high resolution.

On the other hand, positional data recorded in a row of absolute codes may be separated into equally spaced groups by separation signals so that the absolute position can be detected by respective groups of positional data spaced the predetermined number of bits from one another. In addition, the detection of the absolute position can be achieved with high resolution by interpolating between adjoining groups of positional data on the basis of detection signals of a row of incremental codes.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
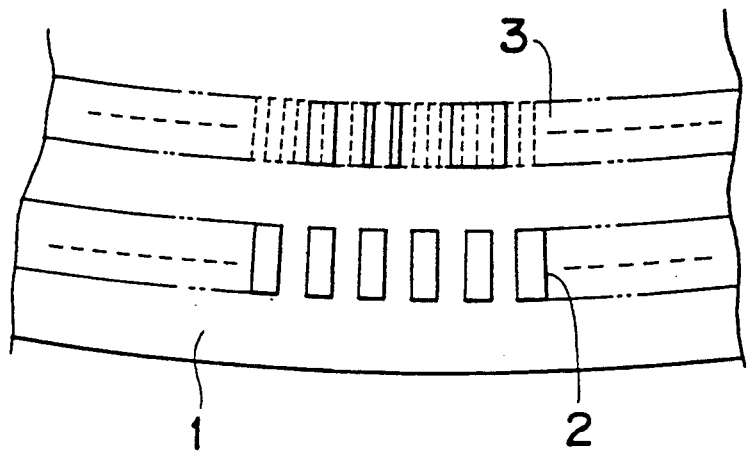
FIG. 1 is a top plan view of a coding plate provided in a position detector according to a first embodiment of the invention.
Figure 2:
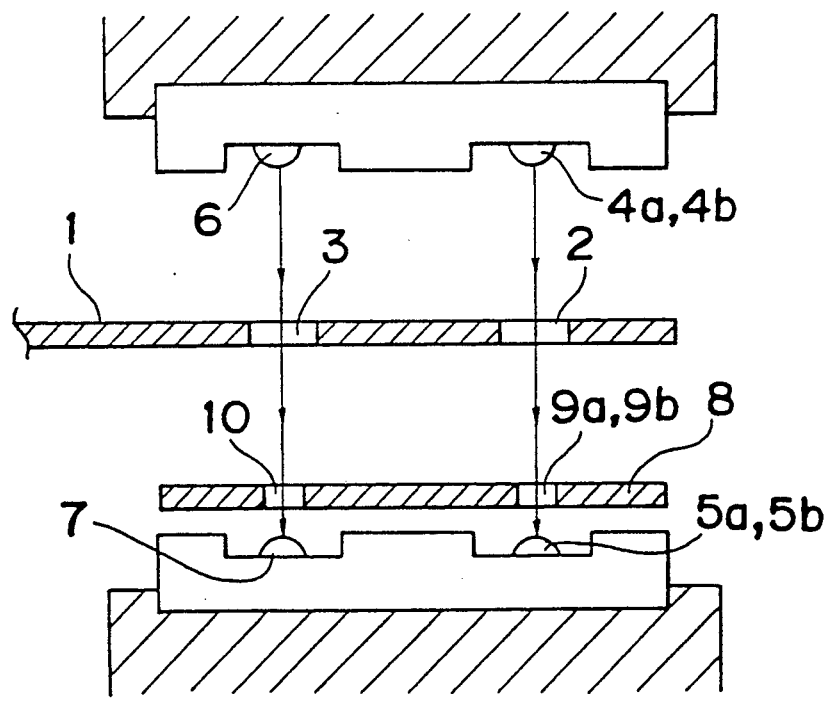
FIG. 2 is a fragmentary side elevational view of the position detector.

Referring now to the drawings, there is shown in FIGS. 1 and 2 a position detector according to a first embodiment of the present invention. The position detector comprises a coding plate 1, which can rotate about its central axis and has two rows of codes 2 and 3 each in the form of a slit formed circumferentially thereof. The external row of codes are incremental codes 2 formed of equally spaced slits whereas the internal row of codes are absolute codes 3 formed of unequally spaced slits. The absolute codes 3 are of binary codes each corresponding to a quarter of one pitch of the incremental codes 2. The binary codes serially record data indicative of respective positions circumferentially of the coding plate 1.

On both sides of the coding plate 1 are disposed two light emitting elements 4a and 4b and two light receiving elements 5a and 5b all confronting the row of incremental codes 2 and a light emitting element 6 and a light receiving element 7 both confronting the row of absolute codes 3. The light emitting elements 4a, 4b and 6 make pairs with the light receiving elements 5a, 5b and 7, respectively. The paired light emitting and receiving elements 4a and 5a and the paired light emitting and receiving elements 4b and 5b detect the row of incremental codes 2 with their phases shifted 90° from each other so that incremental signals of A-phase and B-phase may be obtained.

Between the coding plate 1 and the light receiving elements 5a, 5b and 7 is interposed a masking member 8 having a plurality of openings 9a, 9b and 10 formed therein so as to be opposed to the light receiving elements 5a, 5b and 7, respectively.

Data indicative of the circumferential positions of the coding plate 1 are recorded in the absolute codes 3 using M-series codes, which are known on pages 237–242 in a book entitled "Hadamard's matrix and its application" published Mar. 20, 1980 and written by Zenichi Kiyasu. Whenever each one bit of new positional data is read, the absolute codes 3 of the M-series codes make it possible to recognize the absolute positional data by the bit code corresponding thereto and the predetermined number of bit codes already successively read.

Figure 3:
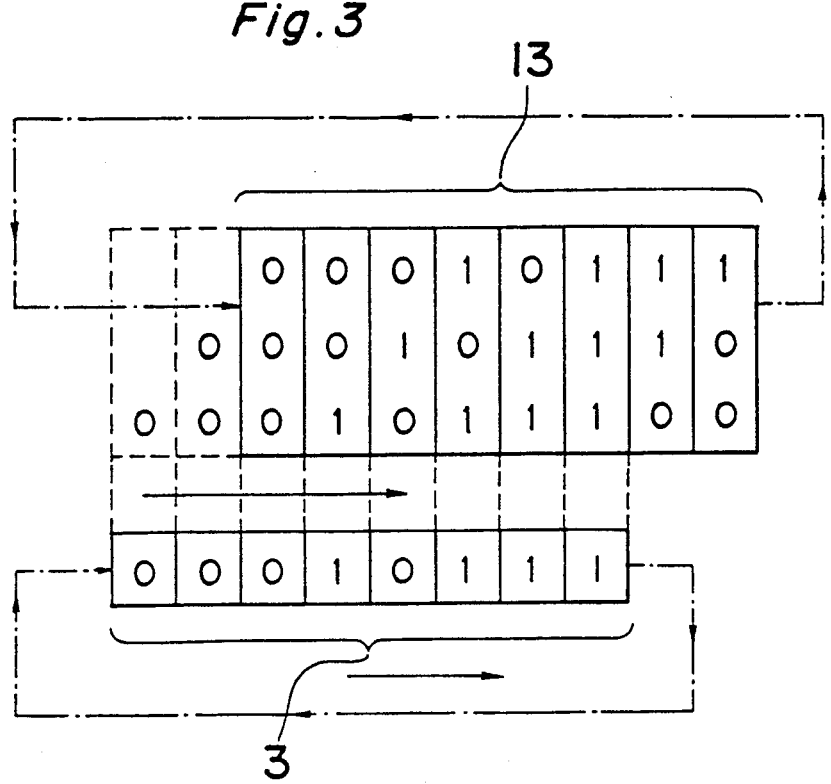
FIG. 3 is a schematic diagram explanatory of M-series codes.

FIG. 3 depicts positional data of the M-series codes of three bits. Codes of "00010111" are initially serially recorded in the row of absolute codes 3. When the first three bits of codes are read, positional data 13 of "000" are obtained. Thereafter, whenever each three bits of codes are read, positional data 13 of "001", "010", "101", "011", "111", "110", and "100" are serially obtained, thereby enabling the detection of respective absolute positions.

Figure 4:
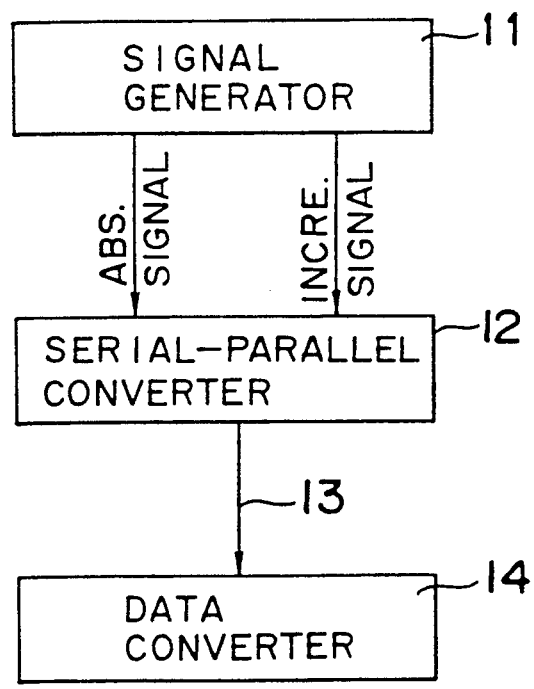
FIG. 4 is a block diagram of a signal processing unit.

FIG. 4 is a block diagram of a signal processing unit for detecting the absolute positions on the basis of the positional data as described above. The signal processing unit comprises a signal generator 11 for generating absolute signals and incremental signals of A-phase and B-phase from detection signals outputted from the light receiving elements 5a, 5b and 7, a serial-parallel converter 12 for converting serial absolute signals to parallel positional data 13 on the basis of the incremental signals, and a positional data converter 14 for converting positional data of binary signals to positional data in a desired form. Since both the signal generator 11 and the positional data converter 14 are known an explanation thereof has been omitted.

Figure 5:
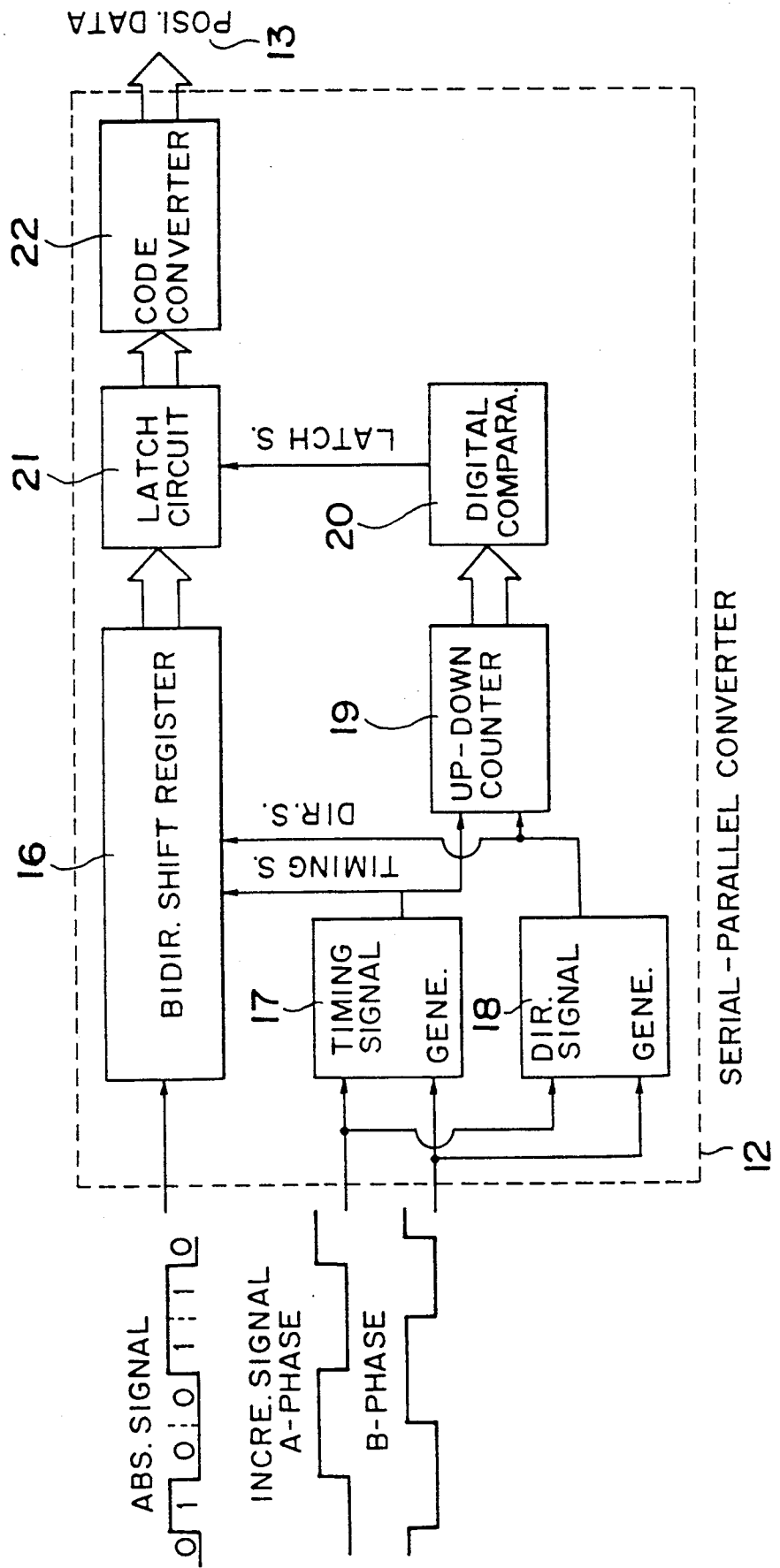
FIG. 5 is a block diagram of a serial-parallel converter.

FIG. 5 is a block diagram of the serial-parallel converter 12. Absolute signals outputted from the signal generator 11 are inputted into a bidirectional shift register 16 whereas incremental signals of A-phase and B-phase are inputted into both a timing signal generator 17 and a directional signal generator 18. Timing signals generated in the timing signal generator 17 are inputted into the bidirectional shift register 16 to effect the reading of the absolute signals and into an up-down counter 19. Directional signals generated in the directional signal generator 18 are also inputted into the bidirectional shift register 16 to restrict the direction in which the absolute signals read are shifted. The directional signals are also inputted into the up-down counter 19 to restrict the counting thereof. Output signals from the up-down counter 19 are inputted into a digital comparator 20, which compares the signals inputted thereinto with a reference value corresponding to the number of bits of the positional data. When a signal inputted into the digital comparator 20 exceeds the reference value, the digital comparator 20 outputs a latch signal to a latch circuit 21. When the latch circuit 21 receives the latch signal, it latches parallel positional data in the bidirectional shift register 16 and inputs them into a code converter 22. The code converter 22 converts the positional data of the M-series codes to absolute binary positional data 13 and outputs the data 13 therefrom.

Figure 6:
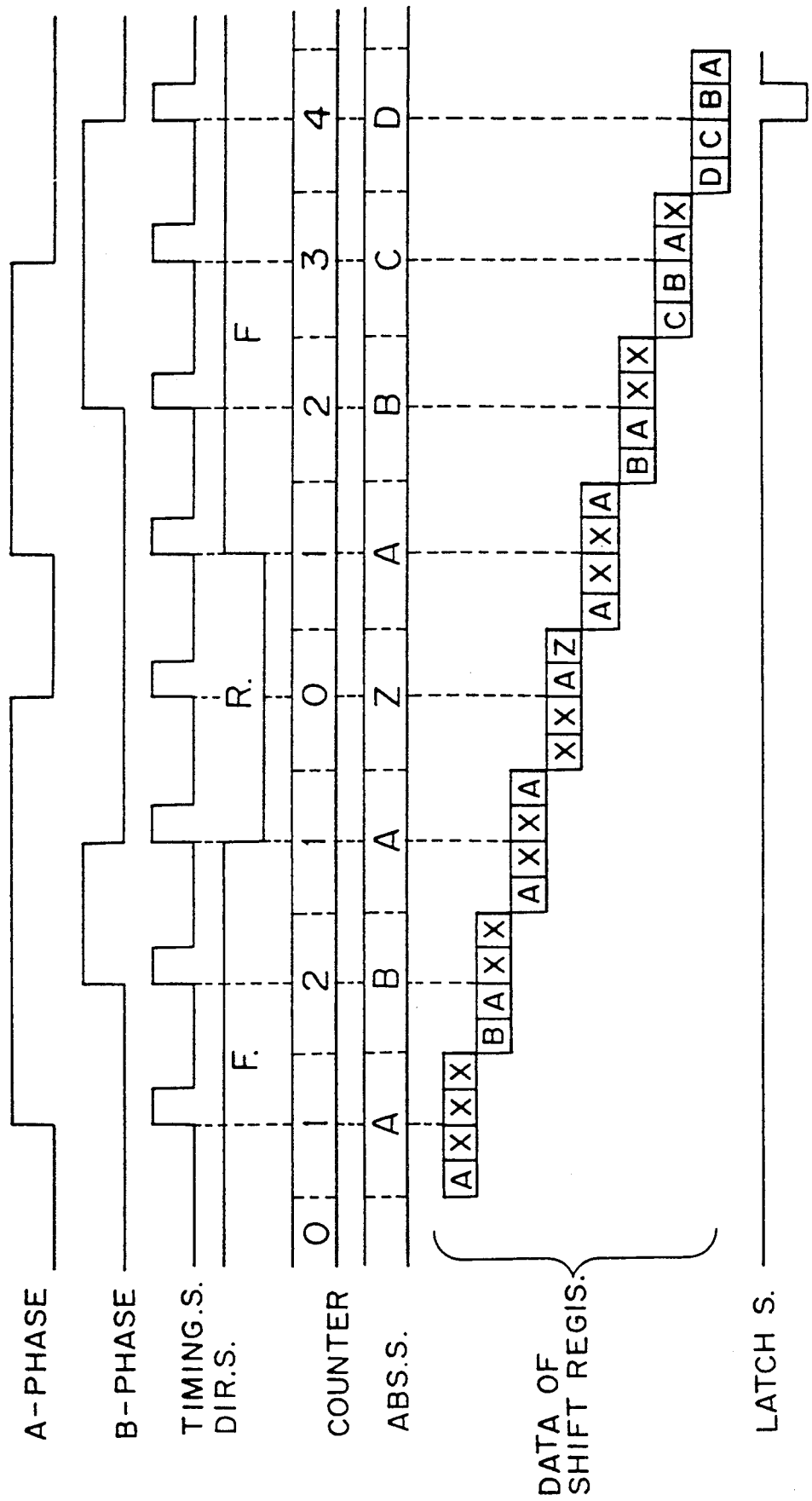
FIG. 6 is a timing-chart indicative of the operation of the serial-parallel converter.

The operation of the serial-parallel signal converter 12 will be discussed hereinafter with reference to a timing-chart of FIG. 6.

The timing signal generator 17 outputs timing signals and the directional signal generator 18 outputs forward or reverse directional signals for each phase of 90° of the incremental signals of A-phase and B-phase. The value of the up-down counter 19 is counted on the basis of these timing signals and the directional signals whereas the absolute signals are read at the timing caused by the timing signals.

Suppose the bidirectional shift register 16 is of four bits while ". . . , Z, A, B, C, D, . . . " are serially recorded in the forward direction as the absolute signals. When the reading is initiated from the absolute signal "A", data of the bidirectional shift register 16 changes from "Axxx" to "BAxx" upon movement of the coding plate 1 to a location indicated by a value "2" of the up-down counter in the forward direction. Thereafter, when the coding plate 1 moves to a location of a counter value "0" in the opposite direction, the data of the bidirectional shift register 16 changes from "BAxx" to "AxxA" and to "xxAZ". Furthermore, when the coding plate 1 moves to a location of a counter value "4" in the forward direction again, the data of the bidirectional shift register 16 changes to be "AxxA", "BAxx", "CBAx" and "DCBA". At the time the counter value becomes "4", the digital comparator 20 outputs a latch signal so that "DCBA" may be outputted as the positional data signals. More specifically, in the M-series codes, unless the absolute signals are serially read by the number of bits (four bits in this embodiment) of the recorded positional data in the same direction, correct positional data cannot be detected. Because of this, the latch timing is set by the up-down counter 19 and the digital comparator 20. Thereafter, upon movement of the coding plate 1 in the same direction, the positional data signals of "EDCB", "FEDC", . . . are serially latched because the up-down counter 19 exceeds "4". As a result, respective absolute positional data are outputted via the code converter 22.

In this way, in the above-described embodiment employing the M-series codes, whenever each one bit of serially inputted absolute signals is read, the absolute position thereof can be detected. Although the absolute position cannot be detected for a certain time period corresponding to the number of bits of the positional data at the beginning of and at the time of reversal of the movement, it becomes possible to serially detect any absolute positions except the beginning of the movement by incrementally interpolating the positional data at the time of reversal of the movement using timing signals or the like. Furthermore, the detection by the absolute signals in combination with that by the incremental signals can treat errors during reading.

Figure 7:
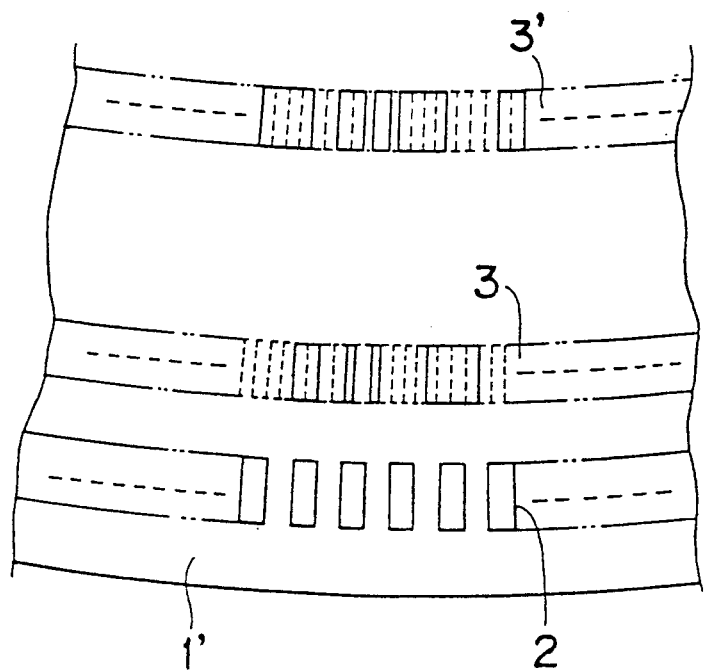
FIG. 7 is a view similar to FIG. 1, showing a modification of the coding plate.

The coding plate 1 shown in FIG. 1 may be modified as shown in FIG. 7. A coding plate 1', of FIG. 7 has a row of equally spaced incremental codes 2 and two rows of unequally spaced absolute codes 3 and 3'. The absolute codes 3' are reversed codes of the absolute codes 3. In the modification of FIG. 7, absolute signals obtained from the absolute codes 3 and 3' are doubled in amplitude as compared with those obtained only from the absolute codes 3, thereby strengthening the absolute signals against noise.

Figure 8:
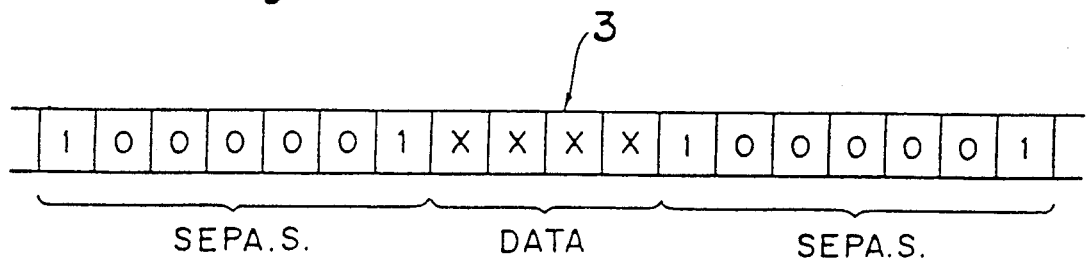
FIG. 8 is a schematic diagram indicative of a recording condition of a row of absolute codes according to a second embodiment of the present invention.

In the above embodiment, although the M-series codes are employed for the row of absolute codes 3, positional data may be serially recorded along with separation signals in the row of absolute codes 3, as shown in FIG. 8.

Figure 9:
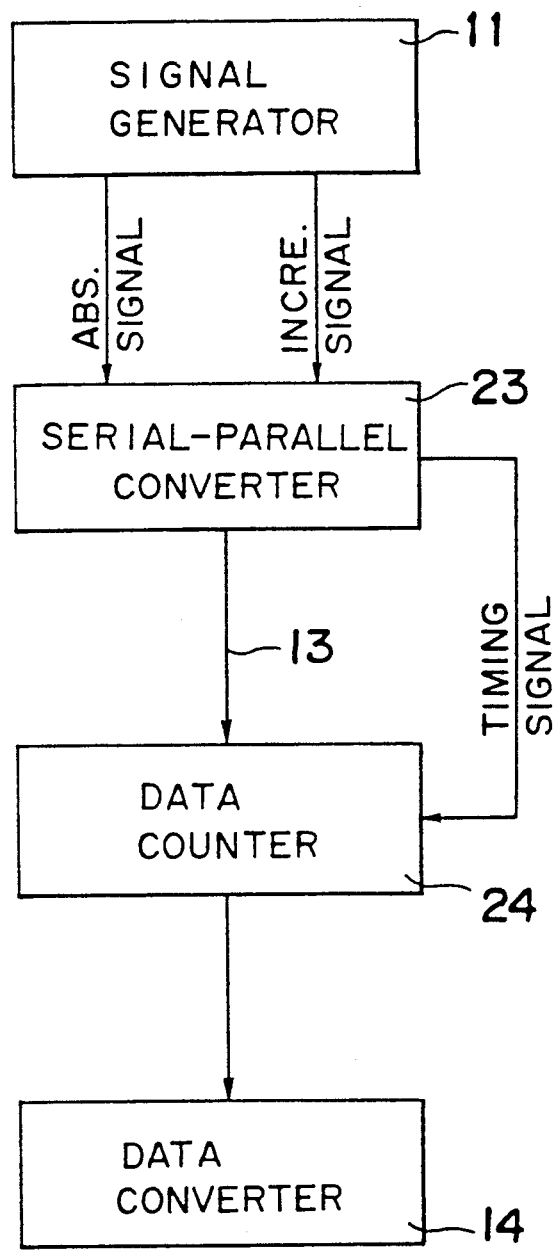
FIG. 9 is a diagram similar to FIG. 4, according to the second embodiment of the present invention.

FIG. 9 is a block diagram of a signal processing unit for processing detected signals, which comprises a signal generator 11 for generating absolute signals and incremental signals of A-phase and B-phase from detection signals outputted from the light receiving elements 5a, 5b and 7, a serial-parallel converter 23 for converting serial absolute signals to parallel positional data 13 on the basis of incremental signals, a positional data counter 24 for serially outputting positional data by incrementally interpolating positional data outputted from the serial-parallel converter 23 using timing signals, and a positional data converter 14 for converting positional data of binary signals outputted from the positional data counter 24 to positional data in a desired form.

Figure 10:
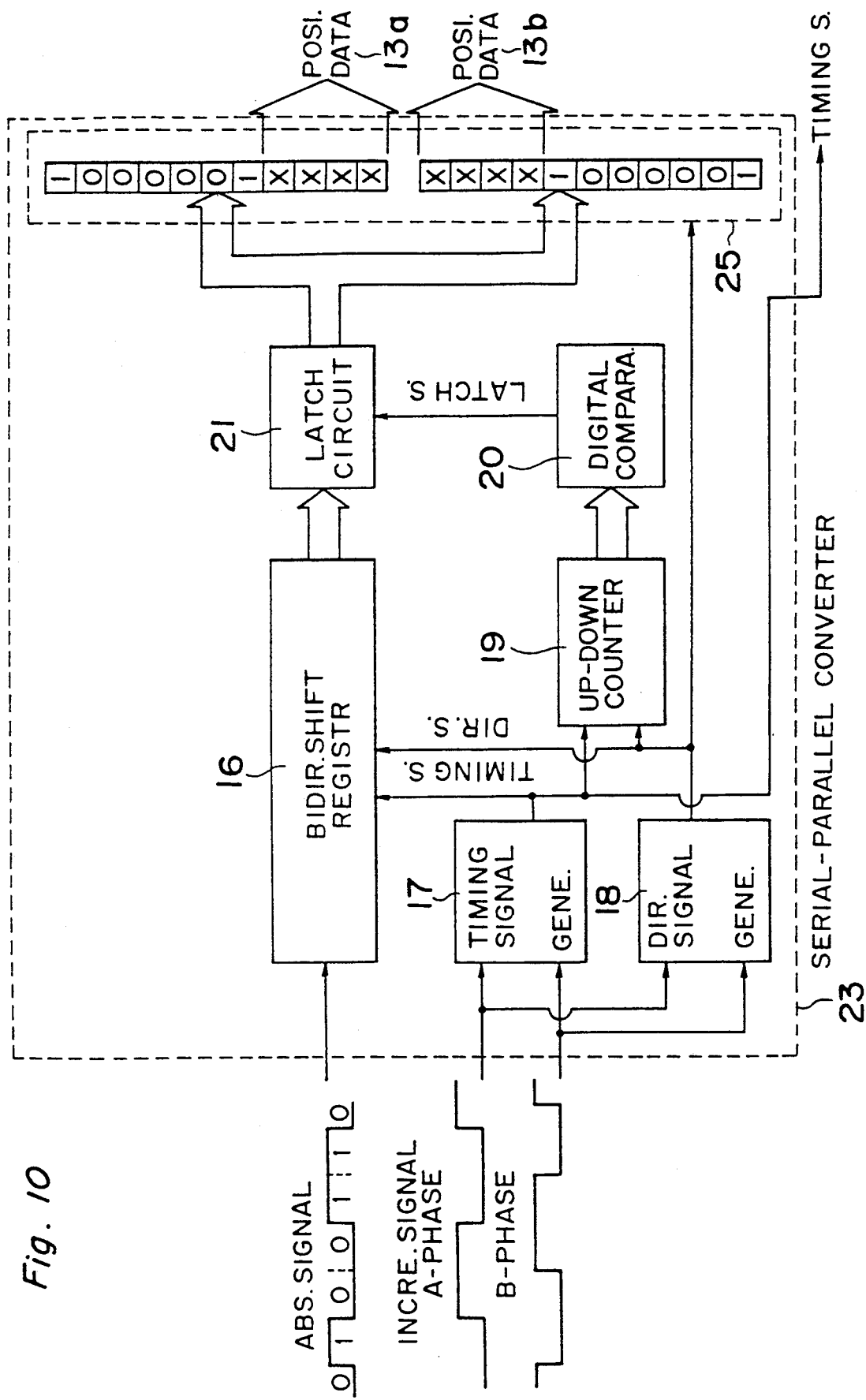
FIG. 10 is a diagram similar to FIG. 5, according to the second embodiment of the present invention.

As shown in FIG. 10, the serial-parallel converter 23 includes a bidirectional shift register 16, a timing signal generator 17, a directional signal generator 18, an up-down counter 19, a digital comparator 20, and a latch circuit 21, as similar to the serial-parallel converter 12 of FIG. 5. The serial-parallel converter 23 further includes a second digital comparator 25 for outputting, as positional data 13, parallel data other than separation signals outputted from the latch circuit 21.

Figure 11A:
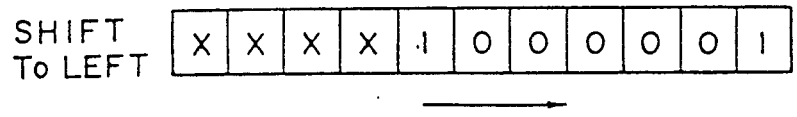
FIGS. 11a and 11b are schematic diagrams explanatory of the operation of a bidirectional shift register according to the second embodiment of the present invention.
Figure 11B:
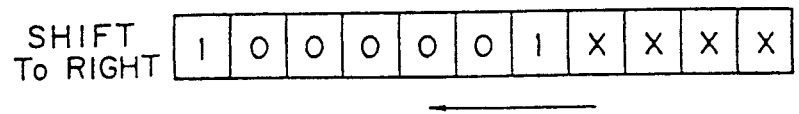

In this embodiment, the bidirectional shift register 16 consists of eleven bits, wherein separation signals of "1000001" and data signals of "XXXX" are successively shifted to the left (FIG. 11a) or to the right (FIG. 11b). When absolute signals more than eleven bits are serially inputted in the same direction by the up-down counter 19 and the digital comparator 20, data stored in the bidirectional shift register 16 are latched by the latch circuit 21 in succession and are inputted into the second digital comparator 25. The second digital comparator 25 outputs "XXXX" as positional data 13 at the time the first or last seven data becomes "1000001" in compliance with the directional signals. These positional data 13 and timing signals are then inputted into the positional data counter 24. As a result, absolute positional data can be successively obtained by incrementally interpolating between the positional data 13a and 13b on the basis of the timing signals.

It is to be noted that in the foregoing embodiments, although a row of codes consist of slits, formed in a coding plate, for transmitting light therethrough and are detected by light detector elements, a magnetic disc, an optical disc, a photomagnetic disc, or the like can also be employed. In this case, any absolute positions circumferentially of the disc can be detected in such a manner that recording spots are detected by a magnetic head or an optical head.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, the should be construed as being included therein.

What is claimed is:

1. A position detector for detecting any of a plurality of positions on a movable element, said position detector comprising:

a coding member having a first row of absolute codes and a second row of incremental codes both formed therein in a direction of movement thereof, said first row serially recording positional data in binary codes, said second row recording regularly formed codes corresponding to respective binary codes;

a single set of detection means for detecting said first row of absolute codes;

plural sets of detection means for detecting said second row of incremental codes;

a means for converting serially detected binary codes of said first row of absolute codes to parallel rows of binary codes based upon detection signals of said second row of incremental codes, said binary codes in each parallel row being equal in number to recording bits of said positional data; and a means for converting said parallel rows of binary codes to positional data so that a position on the movable element is detected whenever a bit of said absolute codes is read;

wherein said detection signals of said second row of incremental codes are used both as timing signals for serially reading said absolute codes and as signals for interpolating an interval between adjacent positions detected by said first row of absolute codes.

2. The position detector according to claim 1, wherein said first row of absolute codes consists of M-series codes., 3. The position detector according to claim 1, wherein said coding member further has a third row of absolute codes consisting of reversed codes of said first row of absolute codes, and wherein the position further comprises a means for detecting said third row of absolute codes.

4. The position detector according to claim 1, wherein said first row of absolute codes records said positional data together with separation signals therebetween.

* * * * *